017,304 numbers...

United States Patent
Dunning

[11] 3,765,997
[45] Oct. 16, 1973

[54] LAMINATE
[75] Inventor: Charles E. Dunning, Neenah, Wis.
[73] Assignee: Kimberly-Clark Corporation, Neenah, Wis.
[22] Filed: May 20, 1971
[21] Appl. No.: 145,545

Related U.S. Application Data
[63] Continuation-in-part of Ser. No. 882,257, Dec. 4, 1969, Pat. No. 3,692,622, which is a continuation-in-part of Ser. No. 783,877, Dec. 16, 1968, abandoned.

[52] U.S. Cl.............. 161/141, 156/62.2, 156/177, 156/179, 156/290, 156/306, 156/324, 156/436, 156/548, 161/57, 161/58, 161/59, 161/148, 161/150, 161/156
[51] Int. Cl............................................. B32b 3/00
[58] Field of Search.................. 161/58, 59, 103, 161/128, 141, 146, 148, 150, 156, 170; 156/62.2, 176, 177, 290, 291, 324, 306; 162/117

[56] References Cited
UNITED STATES PATENTS
3,484,330  12/1969  Sokolowski..................... 161/148
2,902,395   9/1959  Hirschy et al.................... 161/82
3,017,304   1/1962  Burgeni........................... 161/145
3,459,627   8/1969  Vosburgh......................... 161/150
3,043,733   7/1962  Harmon et al.................... 156/209
3,622,423  11/1971  Hadley............................. 161/156
3,616,157  10/1971  Smith.............................. 161/124
2,464,301   3/1949  Francis........................... 161/124
3,025,199   3/1962  Harwood.......................... 161/129

Primary Examiner—William A. Powell
Assistant Examiner—James J. Bell
Attorney—Wolfe, Hubbard, Leydig, Voit and Osann, Ltd.

[57] ABSTRACT

A laminate with improved aesthetic attributes is disclosed. The laminate comprises an air laid web of cellulosic fibers containing a pattern of highly compacted spot-bonded areas and fluffly mound regions of substantially unbonded fibers disposed between the bonded areas. The cellulosic web is united to a network of reinforcing elements, such as a scrim, drafted fiber web, or continuous filament web, with a layer of open patterned adhesive.

7 Claims, 8 Drawing Figures

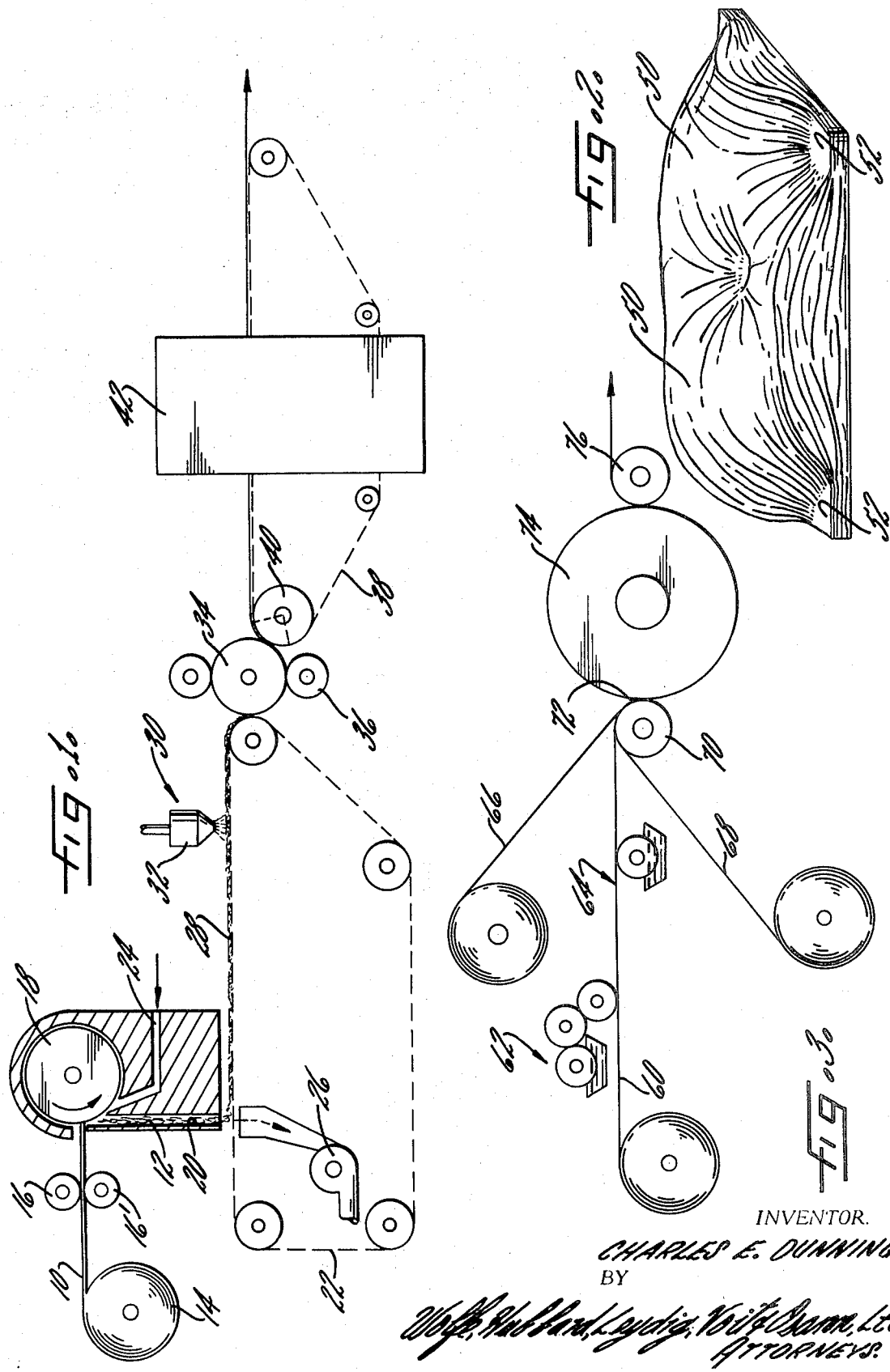

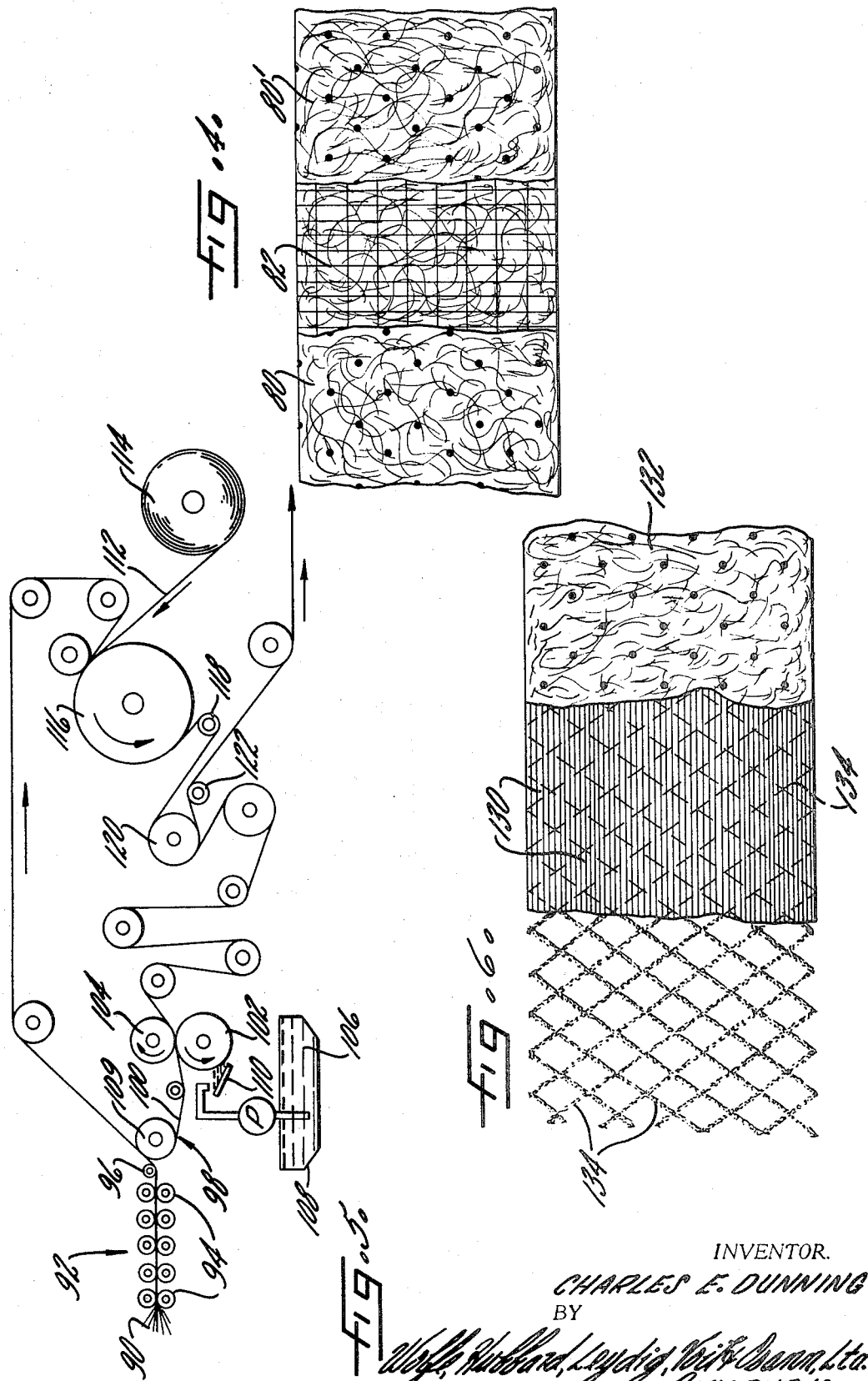

Patented Oct. 16, 1973
3,765,997
3 Sheets-Sheet 3
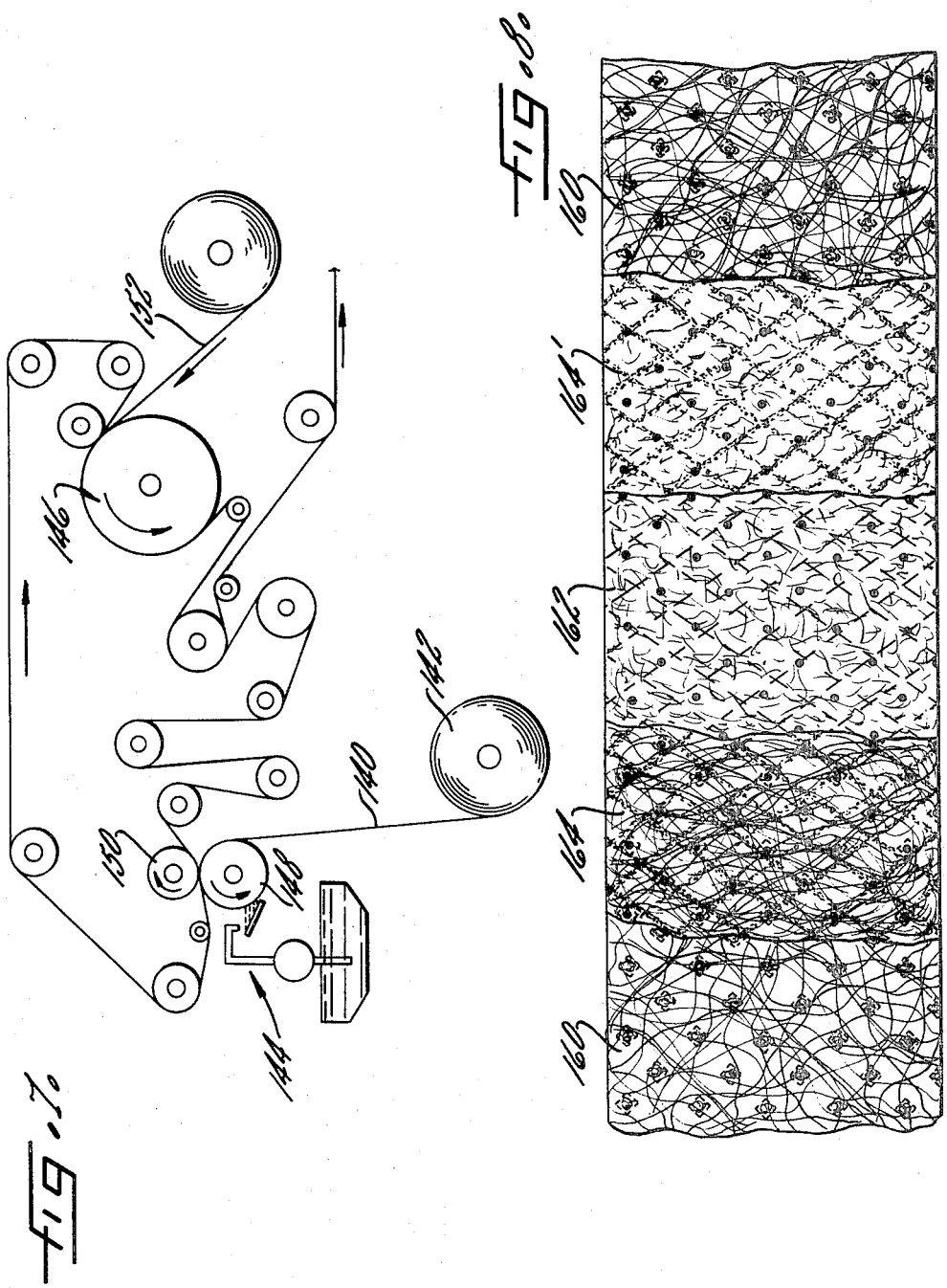
INVENTOR.
CHARLES E. DUNNING
BY
Wolfe, Hubbard, Leydig, Voit & Osann, Ltd.
ATTORNEYS.

LAMINATE

RELATED APPLICATIONS

Charles E. Dunning application entitled "Air Formed Web and Method of Making Such Webs." Ser. No. 783,877, filed Dec. 16, 1968, now abandoned, and Charles E. Dunning application, Ser. No. 882,257, filed Dec. 4, 1969 now U.S. Pat. No. 3,692,622, a continuation-in-part of Ser. No. 783,877.

The present invention is a continuation-in-part of Ser. No. 882,257.

BACKGROUND OF THE INVENTION

The present invention relates to cellulosic products and, more particularly, to cellulosic laminates with improved textile-like characteristics.

Laminates containing creped cellulose wadding reinforced with scrim-like materials or fibrous webs have become increasingly popular in recent years for disposable uses such as garments, bedsheets, wipes, etc. The attractiveness of using such laminates is due, in part, to their inexpensiveness. The wadding constituent provides a desirable product opacity and absorbency while product strength is obtained by means of the reinforcing member. For many uses, the laminates are also treated with fire retardants and/or water repellents which are generally applied from aqueous mediums.

Since many laminate uses require a desirable textile-like feel, it is conventional practice to prepare the laminates in a manner which preserves the basic drapability of the cellulosic web and/or to mechanically treat the laminate in order to enhance its bulk and texture. Thus, product bulk is ordinarily increased by employing several plies of creped wadding and/or mechanically deforming the laminate, such as by embossing or microcreping. Similarly, the drapability of such laminates may be enhanced by bonding the reinforcing web to the creped wadding only at spaced points in the wadding.

While the bulk and other desirable textile-like characteristics of cellulosic laminates can be enhanced in manners such as those above-described, the realization of optimum properties is limited due to the fact that conventional water-formed cellulosic wadding is employed. Due to the initial overall bonding which occurs in the preparation of such wadding, it is very difficult to achieve truly textile-like laminates. Indeed, such laminates typically have a paper-like feel which is highly undesirable. Moreover, when it is necessary to treat the laminates with fire retardants and/or water repellants, the problem of obtaining a laminate with acceptable aesthetic properties becomes increasingly more difficult.

Accordingly, it is a principal object of the present invention to provide reinforced cellulosic web laminates characterized by improved aesthetic attributes, such as appearance and softness, as well as desirable absorbency characteristics.

Another object is to provide laminates of the herein described type which may be fashioned from only a small number of plies of cellulosic webs.

A still further object resides in providing laminates of the aforementioned characteristics which also have a desirable textile-like-bulk.

Yet another object is to provide reinforced cellulosic web laminates having the herein set forth characteristics yet which may also be fashioned with functionally desirable surface characteristics.

Other objects and advantages of the present invention will become apparent as the following description proceeds, taken in conjunction with the accompanying drawings in which:

FIG. 1 is a schematic view and illustrating apparatus for forming an airlaid web for use in forming laminates in accordance with the present invention;

FIG. 2 is a schematic view and showing a portion of a single-ply web with its fluffy, mound-like configuration formed with the apparatus of FIG. 1;

FIG. 3 is a schematic view and illustrating apparatus suitable for forming a laminate in accordance with the present invention wherein the reinforcing member is a nonwoven scrim;

FIG. 4 is a fragmentary plan view of the laminate prepared as shown in FIG. 3, and with sections of individual layers broken away;

FIG. 5 is a schematic view and illustrating apparatus for making a laminate with a continuous filament web;

FIG. 6 is a fragmentary plan view and setting forth the laminate prepared in accordance with the apparatus of FIG. 5, and with sections of individual layers broken away;

FIG. 7 is a schematic view and showing apparatus for forming a laminate with a bonded web of substantially randomly deposited and continuous thermoplastic filaments; and FIG. 8 is a fragmentary plan view of the laminate prepared as illustrated in FIG. 7, and with sections of individual layers broken away.

While the present invention is susceptible of various modifications and alternative constructions, there is shown in the drawings and will herein be described in detail the preferred embodiments. It is to be understood, however, that it is not intended to limit the invention to the specific forms disclosed. On the contrary, it is intended to cover all modifications and alternative constructions falling within the spirit and scope of the invention as expressed in the appended claims.

As illustrated herein, laminates having a desirable textile-like bulk and drape and an aesthetically pleasing soft feel can be prepared by combining, with an open layer of patterned adhesive, an airlaid fiber continuum interrupted by a pattern of spot-bonded areas with a network of reinforcing elements to provide a laminate with a desirable strength-to-weight ratio yet which retains the desirable aesthetic features of the air formed web.

The air formed constituent of the laminates of the present invention will typically have a basis weight of between 10 and 25 lbs.2880 ft.$^2$, with the exact basis weight being determined by the particular product application. Similarly, the type of wood fiber used is not particularly critical and will be determined by the requirements of the product application. Thus, pulps having relatively thin-walled, long fibers (cedars) to coarse pulps with thick fiber walls (southern pine) may be advantageously utilized. The type of pulp employed will generally be determined by the type of texture required by the product: cedar pulps yielding a soft and fluffy texture, southern pine pulps giving a slightly wooly texture and more body. In comparison with ordinary textile fibers, the wood fibers used are of significantly shorter length, the length of textile fibers being on the order of at least three-fourths inch while the fibers used herein generally have a length of less than one-half inch. More particularly, the fibers in the pulps described above have a length distribution of about 1–5 mm. Useful spot-bonded webs have a structure which comprises fluffy mound regions interrupted by a pattern of thin, bonded areas which are less than 40 percent of the height of the mound regions and typically less than about 20 percent of the height. This height differential in combination with the spacing of the bonds at a distance less than the average fiber length of the wood pulp fibers provides a relatively stable structure which will resist collapse of the three-dimensional structure, particularly upon application of liquid thereto. The structure can be visualized, in simplified form, as a number of closely spaced fibers emerging out of a dense coherent hydrogen-bonded area with a substantial Z-direction orientation out of the general plane of the web and separating as they reach the mound regions and then again come closer togeether as they enter the adjacent bond area. Such webs have desirable absorbency and aesthetic characteristics.

The particular network of reinforcing elements with which the air formed web is married will, quite obviously, depend on the product attributes required. Any of the typically used reinforcing materials may be utilized. For example, a nonwoven scrim, such as may be formed in accordance with Hirschy, U.S. Pat. No. 2,841,202, may advantageously serve as the reinforcing layer. Such nonwoven scrims comprise a set of spaced warp or machine direction threads and a set of spaced fill or cross-direction threads. The two sets of threads, disposed in a face-to-face relation to each other are adhesively bonded together where the threads of one set cross the threads of the other set. In addition woven scrims can also be employed. The scrims are customarily prepared from materials such as nylon, rayon, polyester, and the like. Also, the scrim threads can suitably be either monofilament or multifilament yarns having a denier of about 15–100 or perhaps even higher, e.g., up to 400, with the particular warp and fill threads being present in about 1–12 threads per inch.

Another reinforcing member that may be utilized is a drawn staple length fiber web, typically having a weight of about 3–10 gms/yd.$^2$.

Another reinforcing member which provides particularly desirable laminates is a substantially randomly deposited and continuous filament web of a thermoplastic polymer, such webs being generally well known and described in a variety of patents including the following: U.S. Pat. Nos. 3,338,992; 3,341,394; 3,276,944; 3,502,538; 3,502,763; 3,542,615; and Canadian 803,714. In general, such filament webs are prepared by continuously extruding a polymer through a spinneret, drawing the spun filaments, and thereafter depositing the drawn filaments on to a continuously moving surface in a substantially random fashion. Drawing serves to give the polymer filaments tenacity, while substantially random deposition gives the web desirable isotropic strength characteristics.

For use herein, lightweight continuous filament webs having a basis weight of from about 0.3 to about 1 oz. per square yard are ordinarily employed although higher basis weight webs e.g. — up to a basis weight of about 3 oz. per square yard may also be used. Typically, the polymer filaments will have a denier of about 0.5 to 6. The particular thermoplastic polymer utilized in preparing the continuous filament web is not particularly critical with respect to realizing the advantages of the present invention so long as it is spinnable. Due to its cost, predominantly isotactic polypropylene is preferred; however, other polymers such as other polyolefins, e.g. — polyethylene, polyisobutylene, polybutadiene, etc., polyurethanes, polyvinyls, polyamides and polyesters may be used as well as mixtures and copolymers.

In addition to the specific examples herein set forth, other conventional reinforcing materials such as, for example, carded webs can also be used.

Ply attachment between the cellulosic web and the reinforcing means should be achieved with a layer of patterned adhesive so as not to produce an unduly stiff laminate. With respect to scrim reinforcing means, such patterned adhesive attachment can be obtained by simply applying adhesive to the scrim threads since the scrim itself is of open contruction. With other reinforcing means adhesive printing can be accomplished in discontinuous fashions such as by line or brick applications.

The type of adhesive that is used is not particularly critical. Some advantage resides in the use of plastisols, which are colloidal dispersions of synthetic resins in a suitable organic ester plasticizer, such as dibutyl phthalate, and which, under the influence of heat, provide good binding power while remaining soft and flexible. While many adhesives of this type are known, those which have been found to be particularly useful for incorporation include vinyl chloride polymers and copolymers of vinyl chloride with other vinyl resins, plasticized by organic phthalates, sebacates or adipates. These provide a fast-curing plastisol adhesive characterized by relatively low viscosity, low migration tendency, and minimum volatility. Such adhesives remain soft and flexible after curing and can be reactivated by subsequent heating. In addition, other types of adhesive such as latexes (e.g. — acetate/ethylene copolymer emulsions, acrylonitrile-butadiene emulsions) and solvent-based adhesives such as polyvinyl acetates dissolved in a solvent such as acetone may also be used.

In most applications, the amount of adhesive used can vary within wide limits and functionally should be enough to achieve ply attachment. Desirably, the adhesive should cover less than about 25 percent of the surface area of the cellulosic web and preferably less than about 15 percent.

The following Examples are illustrative of the present invention and not in limitation thereof. Unless otherwise expressed, all percentages are by weight.

EXAMPLE 1

Referring to FIG. 1, an airformed wood fiber is formed by initially separating a pulp sheet 10 into its individual fibers 12 by unwinding the pulp sheet 10 from a roll 14 and forwarding the sheet by means of driven rolls 16, 16' to a divellicating means such as a picker roll 18, powered by means not shown. The individual fibers 12 are conveyed through a forming duct 20 and onto a moving foraminous wire 22. Air from a source 24 in combination with a vacuum box 26 creates a downwardly moving stream of air which assists in collecting the airformed web 28 onto the foraminous wire.

While customary air-forming techniques can be utilized in forming the web, the forming duct 20 illustrated in FIG. 1 is particularly efficient in obtaining an especially suitable web, particularly at high speeds. The illustrated duct has a width approximately equal to the height of the picker teeth (not shown) on the picker 18 and is positioned so as to tangentially receive the fibers as they leave the picker. By using a duct with such a width, fiber velocity can be maintained essentially constant throughout the length of the duct. Airlaid continuums formed in this manner have exceptionally good uniformity and are substantially free of fiber floccing or clumping. Appropriate sizing of the forming duct and the spatial arrangement with respect to the picker and the wire are more completely described in copending Appel application, Ser. No. 882,265, filed Dec. 4, 1969 now abandoned, for: "Pulp Picking Apparatus With Improved Fiber Forming Duct."

After formation on the wire 22, the continuum 28 is then forwarded to a moisturizing station, generally indicated at 30, where the moisture content of the web is raised to a level satisfactory for bonding the web as will be hereinafter described. Accordingly, the continuum 28 is then forwarded below a water spray which can comprise a nozzle 32 (or a series of nozzles for wide webs) capable of emitting a generally uniform spray. On leaving the moisturizing station 30, the web desirably has a moisture content of about 15 to about 40 percent, based upon the weight of the wetted web.

After wetting, the web is then transferred from the wire 22 to a transfer roll 34 by passing the wetted web through a nip formed between the wire 22 and the transfer roll 34. Successful transfer of the continuum to the roll 34 depends upon the existence of a moisture gradient between the opposed surfaces of the continuum, with the higher moisture content being present on the surface which contacts the transfer roll.

After transfer of the continuum to the roll 34, bonding of the continuum is accomplished by passing it through a nip formed between the transfer roll 34 and a patterned steel roll 36 having a plurality of raised points. The pattern of the raised points on the roll 36 is not particularly important although this can, to some extent, influence the directional strength characteristics of the bonded web. To avoid significant compaction of the web in other than those areas to be specifically bonded, the sides of the raised points should be desirably comparatively steep with heights of about 0.015 to 0.030 being particularly useful. The pressure applied at the raised points should be sufficient to cause the airlaid fibers to be bonded together so as to form a coherent web structure. Typically, the pressure exerted on the individual points will be at least about 2,000 p.s.i. and be sufficient to decrease the thickness of the web in the bonded areas to about 40 percent of the unbonded areas and desirably about 20 percent.

The total bonded area and the bond frequency may of course be varied by the selection of the raised point pattern on the roll 36. Since the webs are to be combined with a suitable reinforcing means, large bond areas and close bond frequencies are not required and, in fact are undesirable. Total bond areas of about 10 to about 40 percent and bond frequencies on the order of about 10 to 40 per inch across both dimensions of the web can be employed.

After bonding, the web is removed from the surface of the transfer roll 34 and onto a moving foraminous wire 38 by means of a suction roll 40. Where the transfer roll has a steel surface, it is desirable to heat the surface temperature of about at least 200°F. to allow stripping without damage to the web. Similarly, to prevent adherence to the bonding roll, such roll should likewise be heated to a temperature of at least about 150°F., regardless of the type of surface employed for the transfer roll. A heated bonding roll also enhances the bonding operation. The bonded web is thereafter dryed by passage through a through-dryer 42, which, as is conventionally known, passes heated air through the web. Typically, the moisture content of the web will be reduced to less than about 8 percent by weight. The use of a through-dryer retains, and perhaps even enhances, the lofty three-dimensional nature of the web. After drying, the web can be directly laminated in the manner hereinafter described or wound-up for future use.

As illustrated in FIG. 2, the web prepared as herein described is characterized by a continuum of randomly oriented fibers 50 interrupted in a pattern of highly compacted spot-bonded areas 52 spaced less than an average fiber length apart. A cross-sectional view taken along a row of the bonded areas shows that the bonded areas are alternately interrupted by fluffy mounds of substantially unbonded fibers. The fact that substantially no bonding is present in the mound area is due to the absence of strong surface tension forces which normally develop between fibers in water laid processes when water is removed.

The preparation of such airformed, spot--bonded webs is more completely described in my pending application, Ser. No. 882,257. Still further, preferred techniques for preparing such webs are further described in applications filed in even date herewith, "Apparatus For Forming Airlaid Webs" and "High Speed Method For Forming Airlaid Webs."

The following Examples illustrate the preparation of laminates in accordance with the present invention using a variety of different reinforcing means. The cellulosic webs employed in these laminates are prepared in the basic manner described above. The webs are prepared from northern soft wood bleached Kraft fiber pulp sheets. The webs are bonded by means of a plurality of spot hydrogen bonds which occupy about 25 percent of the web surface area and are disposed in a density of about 25 bonds/in. in both web directions.

EXAMPLE 2

This Example illustrates the preparation of a laminate containing outer plies of airformed, wood fiber webs such as herein set forth with each web having a basis weight of about 14 lbs/2880$^2$ and a single, inner nonwoven scrim reinforcing ply (nylon threads of 30 denier — 12 per inch in machine direction, 70 denier — per inch in cross direction).

Turning to FIG. 3, the laminate of the present example is prepared by applying an adhesive to both sides of a scrim 60 at printing stations 62 and 64 and thereafter bringing the adhesively-coated scrim into contact with the air-formed, spot bonded wood fiber webs at the squeeze roll 70 to form the unbonded laminate 72. Bonding of the laminate is then accomplished by passing the laminate 72 through the nip formed between the squeeze roll 70 and a hot roll 74 and subsequently conveying the laminate on the surface of the hot roll until it is removed therefrom over the calender roll 76. The nip pressure between the squeeze roll 70 and the hot roll 74 should be sufficient to cause the adhesive applied to the scrim at the station 62 and 64 to penetrate into the airformed webs. The dwell time of the laminate on the hot roll 74 (as influenced by laminate speed and amount of wrap between rolls 70 and 76)

should be sufficient to effectuate curing of the adhesive.

The following laminating conditions are useful for preparing a scrim-reinforced laminate with the previously identified scrim and airformed, wood fiber webs: Adhesive:Plastisol (100 parts vinyl chloride polymer, 60 parts dioctzl phthalate plasticizer, 25 parts mineral spirits); application viscosity 600 cps; applied in amounts of about 6 gms./sq.yd. to each side of the scrim, Squeeze Roll Pressure: 40 ply.
Roll 74 Temperature: 350°F.
Laminate Dwell Time on Roll 74: about 1 sec.
Calendar Roll 76 Pressure: 200 pli.

Laminates prepared in accordance with the herein illustrated procedure are generally softer and more drapable in comparison with laminates formed with creped cellulosic wadding webs and do not possess to the same level the customary paper-like characteristics of such creped cellulosic wadding laminates.

The thus-formed, scrim-reinforced cellulosic web is further illustrated in FIG. 4 and comprises outer plies 80, 80' of airlaid, spot-bonded wood fiber webs with an interior layer 82 of a nonwoven scrim construction.

EXAMPLE 3

This example illustrates the preparation of a two-ply laminate wherein the reinforcing ply is a web of highly drafted fibers. Referring now to FIG. 5, the laminate is initially formed by passing multiple slivers 90 of textile fibers into a draw frame 92 which comprises a series of pairs of grooved rolls 94, the rolls of each pair being driven by appropriate gearing (not shown, but well known to those skilled in the art) at a peripheral rate of speed somewhat faster than the rate of operation of the preceding pair. Merely by way of example, the pairs of rolls 94 may be adjusted to provide an overall increase in speed and, therefore, an extend of fiber draw on the order of 15:1 through the draw frame 92. As the juxtaposed slivers pass through the draw frame, the individual fibers are drafted and spread out to form a flat, striated web 96 of substantially aligned fibers. Web 96 is maintained adjacent a supporting conveyor sheet 98.

The conveyor sheet 98 can comprise an endless conveyor belt treated on at least its upper surface with a release agent, one example being a woven glass fiber with a surface coating of a tetrafluoroethylene resin. Other examples of release coatings are well known, and include such materials as silicones, fatty acid metal complexes, certain acrylic polymers and the like. Heat-resistant films or thin metal sheets treated with release agents can also be used as the carrier sheet.

Prior to the time the drawn web 96 is picked up by the belt 100, the latter has imprinted on its release-treated surface an open pattern of adhesive. Adhesive printing is accomplished by feeding the belt 100 through the nip formed between a printing roll 102 and a back-up roll 104 maintained in very light pressure engagement therewith. The surface of printing roll 102 is provided with a preselected intaglio pattern to which adhesive can be supplied in various ways well known to those skilled in the art. In the illustrative embodiment, adhesive 106 from the supply pan 108 is pumped or otherwise transferred to a reservoir located immediately above an inclined doctor blade 110 — the reservoir being defined in part by the upper surface of the inclined doctor blade and the adjacent portion of the rotating periphery of the surface of the printing roll 102. As the printing roll 102 rotates (in a counter-clockwise direction as viewed in FIG. 5), the intaglio-patterned surface thereof is filled with adhesive 106, excessive adhesive being removed by the doctor blade 110, and a metered amount of adhesive is then transferred to the release-coated belt 100 in the preselected pattern. It will be understood that, as shown in FIG. 5, the adhesive is actually on the underside of belt 100 which becomes the upper surface after passing around roll 108, at which time the adhesive pattern directly contacts the fiber flow web 96.

The particular dimensions of the intaglio pattern employed and, indeed, tue actual pattern itself, are not critical. Satisfactory results have been achieved with a diamond pattern in which adjacent lines of adhesive have been spaced apart in both directions by about one-fourth inch, and wherein the intaglio printing roll 102 has adhesive cells or lines 0.007 inch deep and 0.025 inch wide.

Because the surface of belt 100 is treated with a release coating, the adhesive remains substantially on the surface with no penetration therein and is preferably in a somewhat tacky condition. In combining the drafted fiber web 96 with the adhesively printed belt, its is necessary to feed the belts 100 around roll 109 at a speed slightly in excess of the delivery speed of the final pair of rolls 94 of the draw frame 92 in order to maintain the web 96 under slight tension so that the individual highly drafted fibers are retained in their aligned and tensioned condition, and the resulting bonded web has maximum strength. Thus, the web 96 emerging from the draw frame 92 is deposited on the tacky adhesive 106 on belt 100 and held in tension engagement therewith by the adhesive.

Following deposition of the web 96 on to the adhesively printed belt, a spot-bonded, airlaid web 112 (formed as described in FIG. 1) is unwound from a roll 114 and is brought together with the adhesive fiber web on belt 100 at the squeeze roll 115. The resulting laminate is then drawn around a heated curing drum 116 where solidification and/or fusing of the adhesive is substantially completed while the airlaid web 112 and the drawn web 96 are maintained in firm contact to bond the respective layers together. To insure adequate ply attachment, it is desirable that travel of the combined belt and laminate be around a substantial portion of the drum 116. A fly roll 118 can be suitably positioned to apply tension to the combined belt and laminate to enhance the lamination.

After leaving the fly roll 118, the laminate and belt are preferably passed over a drive roll 120, which can also serve as the cooling drum to set the adhesive. The laminate may then be easily stripped from the release-coated surface of the belt 100 by a guide roll 122 as the laminate leaves the cooling drum 120.

Turning now to FIG. 6, the thus-formed laminate can be seen to comprise a drawn web 130, and an airlaid, spot-bonded web 132 adhesively bonded together by a diamond pattern 134.

Using apparatus such as has been described in connection with FIG. 5, specific drafted fiber web-cellulosic web laminate of the following construction can be readily prepared:

Drafted fiber web: staple length rayon fibers — web basis weight of 5 gms/yd$^2$.

Cellulosic web: spot-bonded, airlaid web prepared as described in Example 1 — web basis weight of 20 lbs/2880 ft².

Adhesive: plastisol identified in Example 2 with less mineral spirits — application viscosity 2,000 cps. - applied in previously identified preferred diamond pattern in amount of 9 gms/yd².

The following laminating conditions may also be employed: belt 100: woven glass with tetrafluoroethylene release coating; drum 116 temperature: 300°F.; dwell time on drum 116: about 5 sec.; squeeze roll 115 pressure; about 30 psi.

While the drawn fiber-cellulosic web formed as herein identified may be advantageously used in some applications, it should be appreciated that the strength in the direction of alignment of the fibers in the drawn web is considerably greater than that in the cross direction. Accordingly, for some applications, it will be desirable to cross lay such laminates to provide disposable orthotropic strength characteristics. Suitable crosslaying techniques are well known.

EXAMPLE 4

This example illustrates the preparation of a soft, drapable laminate with a scrim material on one side, a spot-bonded, airlaid wood fiber web as an inner ply, and a drafted fiber web on the other side. The outer plies provide abrasion-resistant surfaces with the scrim material also contributing a desirable degree of cross-directional strength to the product. The presence of the distinctive inner cellulosic ply provides laminate bulk, softness and absorbency.

Th laminate can be prepared by first forming a two-ply, drafted web-airlaid wood fiber web laminate by the procedure illustrated in Example 3 and in FIG. 5, and then uniting this laminate with a scrim material in the manner described in Example 2 and illustrated in FIG. 3 (the airlaid, spot-bonded web 68 and the printing station 64 are not employed and the two-ply laminate is used in place of the web 66). Useful laminating conditions are as follows:

Preparation of two-ply laminates – as in Example 3
Preparation of three-ply laminates:
Scrim: nylon threads of 30 denier — 6 per inch in machine direction, 70 denier — 5 per inch in cross-direction.
Adhesive: Plastisol (100 parts vinyl chloride polymer 60 parts dioctyl phthalate plasticizer, 25 parts mineral spirits); application viscosity 600 cps; applied in amount of about 6 gms/sq.yd. to side of the scrim.
Squeeze Roll Pressure: 40 ply.
Roll 74 Temperature: 350°F.
Laminate Dwell Time on Roll 74: about 1 sec. calendar roll 76 pressure; 200 pli.

The remaining example illustrates the preparation of products containing a continuous filament web which possess particularly outstanding fabric-like characteristics.

The general method for forming the continuous filament webs have been previously set forth. Such webs may be laminated to the spot-bonded, airlaid webs according to the present invention while such continuous filament webs are in their unbonded form; however, it is generally desirable to bond the webs into a stable structure prior to lamination. Bonding increases the strength of the resulting laminate and additionally enhances the abrasion rresistance of the web, a particularly desirable feature when the continuous filament web forms a surface layer of the laminate. Autogeneous bonding whereby the filaments in the web are secured together under the sction of the helat and pressure is costomarily employed for web stabilization. A suitable method for such bonding is disclosed in copending Hensen and Pennings application entitled "Pattern Bonded Continuous Filament Web," Ser. No. 121,880, filed Mar. 8, 1971. Web bonded according to the technique illustrated therein contain a intermittent pattern of autogeneous bond areas distributed substantially uniformly throughout the continuous filament web. The total bonded area of the web is about 5–50 percent with the density of the individual bond being about 50–3,200 per square inch, the higher bond densities being employed with the higher total bonded areas. Webs so bonded possess a desirable combination of "hand" and tensile strength. As disclosed in the aforementioned application, such bonded webs can be prepared by passing an unbonded continuous filament web through a pressure nip formed between a smooth hard roll and a heated patterned roll containing a plurality of raised points. Continuous filament web-cellulosic laminates possessing very desirable energy absorbing characteristics are described in copending application Ser. No. 126,530 filed on Mar. 22, 1971.

EXAMPLE 5

A laminate of a continuous filament web and a spot-bonded, airlaid wood fiber web can be conveniently prepared using the apparatus depicted in FIG. 7. In its basic aspects, the apparatus therein disclosed is quite similar to the apparatus shown in FIG. 5, except that adhesive printing is directly accomplished on a continuous filament web 140 unwound from a roll 142, there being no necessity for including an independent conveyor sheet. The illustrated printing station 144 and the heated curing drum 146 function in substantially the same manner as previously described in connection with the FIG. 5 embodiment.

As seen in FIG. 7, laminate formation is accomplished by printing adhesive on the continuous filament web 140 by passing the web through the nip formed between a printing roll 148 and a back-up roll 150 and then bringing the spot-bonded airlaid wood fiber web 152 into contact with the adhesively printed surface of the web 140 at the heated drum 146. The dwell time of the laminate on the heated drum 146 as well as the tension applied thereto must be sufficient to cure the adhesive and effectuate ply attachment by forcing the adhesive in the selected print pattern to encapsulate the continuous filament web and penetrate into the cellulosic wadding web.

Using apparatus such as depicted in FIGS. 1 and 7, the continuous filament web — airformed, spot-bonded wood fiber can be prepared as follows:
Lamination
Continuous filament web 140: polypropylene filaments having a denier of about 1.5–2; web basis weight of about 0.5 oz/yd²; bonded with an intermittent pattern of autogeneous spot bonds in a density of about 200/per square inch and occupying 18 percent of the web area.
Cellulosic web: as described in Example 1 with a basis weight of 14 lbs/2,880 ft.².
Adhesive printing station 148: Same as Example 3.

Drum 146 temperature: 300°F.

Dwell time on drum 146: about 5 sec.

By using the basic procedure laminates of continuous filament webs and airlaid cellulosic webs which contain more than just two-plies may be readily fashioned. For example, by replacing the continuous filament web 140 with a continuous filament web-cellulosic web laminate formed by the Example 5 procedure and printing the adhesive on the filament side of the laminate, a three-ply laminate containing outer cellulosic web plies and an inner continuous fialment web can be prepared.

Similarly, by replacing the airlaid, spot-bonded web 152 with the two-ply laminate and bringing the cellulosic web surface into contact with the adhesively printed surface of the web 140, a three-ply laminate having outer continuous filament webs and an inner cellulosic web can be fashioned.

The latter three-ply laminate is depicted in FIG. 8. As shown, the laminate comprises outer plies 160 of continuous filament webs and an inner ply 162 of an airlaid, spot-bonded web. The laminate is adhesively bonded together by adhesive layers 164, 164'.

It should be appreciated that, as is the case with conventionally used creped wadding, the method of fashioning the laminate may adversely effect the drape, hand and feel of the cellulosic, airlaid web. However, in contrast to the creped wadding in which it is very difficult to achieve truly textile-like laminates even with extensive mechanical deformation of the wadding either prior to lamination or of the laminate itself, the laminates of the present invention can be compressively deformed to provide significant general loosening and fluffing of the web in regions between adhesive attachment. The remarkably soft feel and other desirable attributes of the laminates following compressive deformation such as by microcreping or clupaking are believed to be attributable to such loosening and fluffing of the airlaid web. Moreover, such compressive deformation does not adversely effect the overall integrity of the airlaid web nor result in excessive disruption of the spot-bonds. In short, the laminates of the present invention provide a base material which may be processed by such techniques to achieve textile-like qualities unattainable with creped wadding webs.

The continuous filament airlaid web laminate provides particularly outstanding textile-like characteristics when treated by such compressive deformation techniques. It is hypothesized that not only does the compressive deformation act on the airlaid cellulosic web in a manner which accentuates bulk and softness but additionally "works" on the continuous filament web that also increases its overall softness and bulk. However, with a laminate having an outer ply of the continuous filament web, the surface is quite abrasion resistant, a fact which indicates that the increased softness and bulkiness of the laminate is not principally due to the breakage of the autogeneous spot-bonds in the continuous filament web. Compressive deformation of laminates referred to herein is more completely described in copending Braun application entitled "Compressively Deformed Cellulosic Laminates With Improved Drape, Bulk and Softness," filed in even date herewith.

What is claimed is:

1. A soft, bulky cellulosic laminate comprising a lightweight airlaid web comprising a continuum of random-laid cellulosic fibers having a length of less than about 0.5 inch, the continuum being interrupted by a pattern of highly compacted self-bonded areas occupying about 10–40 percent of the web area, the bonded areas being spaced less than about an average fiber length apart and the web fibers in other areas forming substantially unbonded fluffy mounds having a thickness of at least about 2.5 times the thickness of the bonded areas and a network of reinforcing elements united to said web with a layer of patterned adhesive.

2. The laminate of claim 1 wherein the airlaid web has a basis weight of from about 10 to about 25 lbs/2880 ft.$^2$.

3. The laminate of claim 1 wherein the adhesive covers less than about 25 percent of the surface area of the airlaid web.

4. The laminate of claim 1 wherein the network of reinforcing elements comprises a nonwoven scrim.

5. The laminate of claim 1 wherein the network of reinforcing elements comprises a drafted web.

6. The laminate of claim 1 wherein the network of reinforcing elements is a lightweight continuous filament web.

7. A soft, bulky textile-like laminate comprising a central ply of an airlaid, wood fiber web comprising a continuum of random-laid fibers having a length of less than about 0.5 inch, the continuum being interrupted by a pattern of highly compacted self-bonded areas occupying about 10–40 percent of the web area, the bonded areas being spaced less than about an average fiber length apart and the web fibers in other areas forming substantially unbonded fluffy mounds, said web having a basis weight of about 10 to 25 lbs. /2,880 ft.$^2$ and outer plies united to the airlaid web with a layer of patterned adhesive, each ply comprising a continuous filament web having a basis weight of from about 0.3 to about 1 oz./yd$^2$ and being autogeneously bonded with a density of about 50–3,200 per square inch, a total bonded area of about 5–50 percent and the bonds being distributed substantially uniformly throughout the continuous filament web.

* * * * *